US012606067B2

(12) United States Patent
Kurokawa

(10) Patent No.: US 12,606,067 B2
(45) Date of Patent: Apr. 21, 2026

(54) VEHICLE SEAT BACK FRAME

(71) Applicant: TOYOTA BOSHOKU KABUSHIKI KAISHA, Aichi (JP)

(72) Inventor: Kimiyasu Kurokawa, Nakatsugawa (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 154 days.

(21) Appl. No.: 18/766,741

(22) Filed: Jul. 9, 2024

(65) Prior Publication Data

US 2025/0018845 A1     Jan. 16, 2025

(30) Foreign Application Priority Data

Jul. 11, 2023     (JP) ................................. 2023-113846

(51) Int. Cl.
*B60N 2/75*          (2018.01)
*B60N 2/68*          (2006.01)
(52) U.S. Cl.
CPC ............. *B60N 2/682* (2013.01); *B60N 2/686* (2013.01)
(58) Field of Classification Search
CPC .......... B60N 2/68; B60N 2/682; B60N 2/686; B60N 2/4228; B60R 21/207; B60R 22/26
See application file for complete search history.

(56) References Cited

U.S. PATENT DOCUMENTS

| | | | | |
|---|---|---|---|---|
| 5,246,267 A * | 9/1993 | Nagashima | ............ | B60N 2/757 |
| | | | | 297/411.32 |
| 10,500,996 B2 * | 12/2019 | Tsuchiya | ................ | B60N 2/682 |
| 2010/0141009 A1 | 6/2010 | Kirch et al. | | |
| 2017/0008432 A1 * | 1/2017 | Matsui | ................... | B60N 2/753 |
| 2019/0084457 A1 * | 3/2019 | Okuma | ................. | B60N 2/427 |
| 2019/0184870 A1 * | 6/2019 | Clark | ................... | B60N 2/686 |
| 2019/0217757 A1 * | 7/2019 | Kato | ...................... | B60N 2/682 |
| 2020/0010003 A1 * | 1/2020 | Okuma | ................. | B60N 2/897 |
| 2025/0018845 A1 * | 1/2025 | Kurokawa | ............. | B60N 2/682 |
| 2025/0381895 A1 * | 12/2025 | Yamamoto | .............. | B60N 2/68 |
| 2025/0388150 A1 * | 12/2025 | Kurokawa | ............. | B60N 2/686 |

FOREIGN PATENT DOCUMENTS

| | | |
|---|---|---|
| DE | 102006033156 A1 | 1/2008 |
| JP | 2011178300 A | 9/2011 |
| JP | 2023-014021 A | 1/2023 |

OTHER PUBLICATIONS

German Office Action issued on Mar. 26, 2025 in the corresponding German Patent Application No. 102024115202.8 and its English translation.

* cited by examiner

*Primary Examiner* — Shin H Kim
(74) *Attorney, Agent, or Firm* — Greenblum & Bernstein, P.L.C.

(57)          ABSTRACT

In a back frame applied to a seatback, a first flange of a first reinforcing member is joined to a panel member at either or both of a portion on at least either of sides across a diagonal center line of the panel member and a portion crossing the diagonal center line, and second flanges of the first reinforcing member are joined to the panel member at respective portions on one side and the other side across the diagonal center line. A part of a second reinforcing member on a side of an intersection point between a first side part and a second side part of the panel member is overlapped and joined with a first wall of the first reinforcing member.

4 Claims, 9 Drawing Sheets

VEHICLE SEAT BACK FRAME

CROSS-REFERENCE TO RELATED APPLICATIONS

This application claims the benefit of Japanese Patent Application No. 2023-113846 filed on Jul. 11, 2023 with the Japan Patent Office, the disclosure of which is incorporated herein by reference in its entirety.

BACKGROUND

The present disclosure relates to a back frame applied to a seatback of a vehicle seat.

For example, in the invention described in Japanese Unexamined Patent Application Publication No. 2023-14021, reinforcing members each having a substantially C-shaped cross section or a substantially U-shaped cross section with corners are disposed at an edge of a plate-shaped panel member to form a frame in the shape of a picture frame, thereby improving strength of the back frame.

In the invention described in Japanese Unexamined Patent Application Publication No. 2023-14021, for example, a reinforcing member extending in a horizontal direction on a lower side of the panel member and a reinforcing member extending in up-down directions on a right side of the panel member are coupled with each other via a corner bracket.

SUMMARY

In the invention described in Japanese Unexamined Patent Application Publication No. 2023-14021, the reinforcing members intersecting with each other are coupled via the corner bracket. Therefore, it is difficult to effectively improve the strength of the back frame. The present disclosure discloses an example of a vehicle seat back frame in view of this point.

A back frame applied to a seatback of a vehicle seat preferably includes, for example, at least one of the following components.

That is, the components are a panel member including metal and having a substantially rectangular plate shape, a first reinforcing member including metal and extending along a first side part of the panel member, the first reinforcing member being fixed to the panel member on a side of the first side part, and a second reinforcing member including metal and extending along a second side part of the panel member orthogonal to the first side part, the second reinforcing member being fixed to the panel member on a side of the second side part.

The first reinforcing member has a first wall facing the panel member across a gap, a second wall extending toward the panel member from an end portion of the first wall positioned on a side of a face center of the panel member, a third wall extending toward the panel member from an end portion of the first wall opposite to the second wall, a first flange extending in a direction intersecting an extending direction of the second wall from an end of the second wall in the extending direction of the second wall, at least a part of the first flange being joined to the panel member, and second flanges extending in directions intersecting an extending direction of the third wall from ends of the third wall in the extending direction of the third wall, at least a part of each of the respective second flanges being joined to the panel member.

On an assumption that a diagonal line of the panel member passing through a virtual intersection point between the first side part and the second side part is a diagonal center line, the first flange is preferably joined with the panel member at either or both of a portion on at least either of sides across the diagonal center line and a portion crossing the diagonal center line, the second flanges are preferably joined with the panel member at respective portions on one side and the other side across the diagonal center line, and a part of the second reinforcing member on a side of the intersection point is preferably overlapped and joined with the first wall.

Thus, in the vehicle seat back frame, strength at the intersection point, that is, strength at a corner of the panel member, can be effectively improved.

The vehicle seat back frame may have the following configurations.

That is, the second reinforcing member preferably has a first wall facing the panel member across a gap, a second wall extending toward the panel member from an end portion of the first wall positioned on a side of the face center, a third wall extending toward the panel member from an end portion of the first wall opposite to the second wall, a first flange extending in a direction intersecting an extending direction of the second wall from an end of the second wall in the extending direction of the second wall, at least a part of the first flange being joined to the panel member, and a second flange extending in a direction intersecting an extending direction of the third wall from an end of the third wall in the extending direction of the third wall, at least a part of the second flange being joined to the panel member, and the first wall of the first reinforcing member and the first wall of the second reinforcing member are preferably overlapped and joined with each other.

Thus, a frame including the panel member and at least either the first reinforcing member or the second reinforcing member forms a part having a continuous closed cross-sectional shape. Therefore, a load due to an external force can be effectively transmitted to the entire frame, and concentration of stress on a part of the back frame can be reduced.

The frame is preferably provided with a coupling part for coupling with a bracket fixed to a vehicle. The coupling part is preferably provided on a panel member forming the frame on the side of the intersection point.

BRIEF DESCRIPTION OF THE DRAWINGS

An example embodiment of the present disclosure will be described hereinafter with reference to the accompanying drawings, in which.

DETAILED DESCRIPTION OF EXEMPLARY EMBODIMENTS

Figure 1:
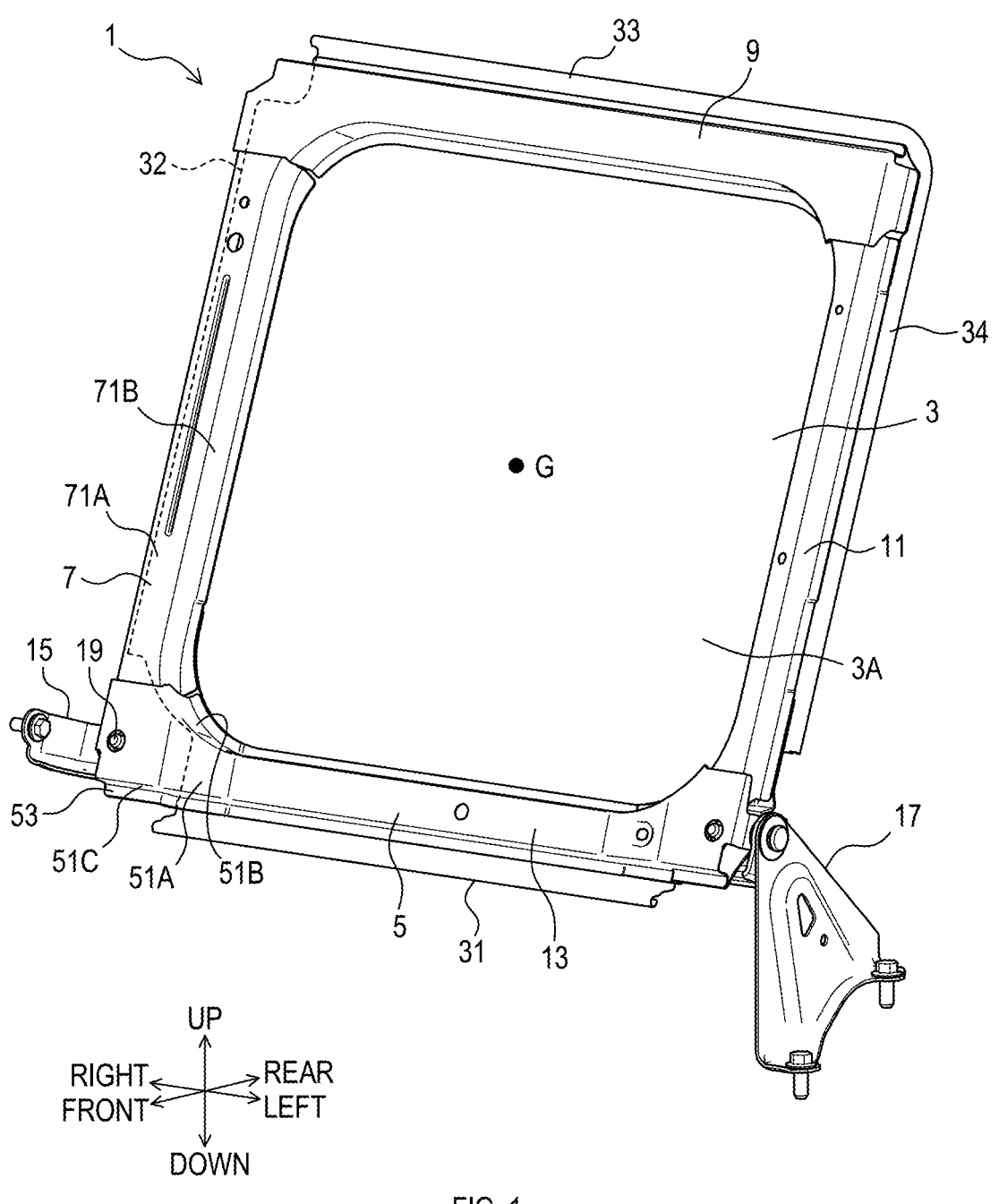
FIG. 1 is a view showing a back frame according to a first embodiment.

The following embodiments of the present invention describe examples of embodiments falling within the technical scope of the present disclosure. That is, matters used to define the invention and the like described in the claims are not limited to the specific configurations, structures and the like described in the following embodiments.

The present embodiments describe examples in which a vehicle seat back frame (hereinafter, abbreviated to a "back frame") according to the present disclosure is applied to a back frame of a seat mounted on a vehicle such as an automobile (hereinafter, referred to as a "vehicle seat").

The back frame is a member that constitutes a framework of a seatback. The seatback is a part for supporting the back of a seated person. Note that arrows denoting directions, hatched areas, and the like on the drawings are for the sake of assisting understanding of relations between the drawings, and shapes or the like of the members or parts.

Therefore, orientation of the back frame is not limited to the orientations shown in the drawings. The directions shown in the drawings represent directions in a state where the back frame is mounted to the automobile. A view with a hatched area does not necessarily represent a cross-sectional view.

For at least members or parts denoted by reference signs, at least one member or part is provided unless described with "only one" or the like. The back frame described in the present disclosure includes at least one of components, such as members or parts, at least denoted by reference signs and structural parts shown in the drawings.

First Embodiment

<1. Overview of Back Frame>

As shown in FIG. 1, a back frame 1 according to the present embodiment includes at least a panel member 3, a first reinforcing member 5, a second reinforcing member 7, a third reinforcing member 9, a fourth reinforcing member 11, and the like.

Figure 2:
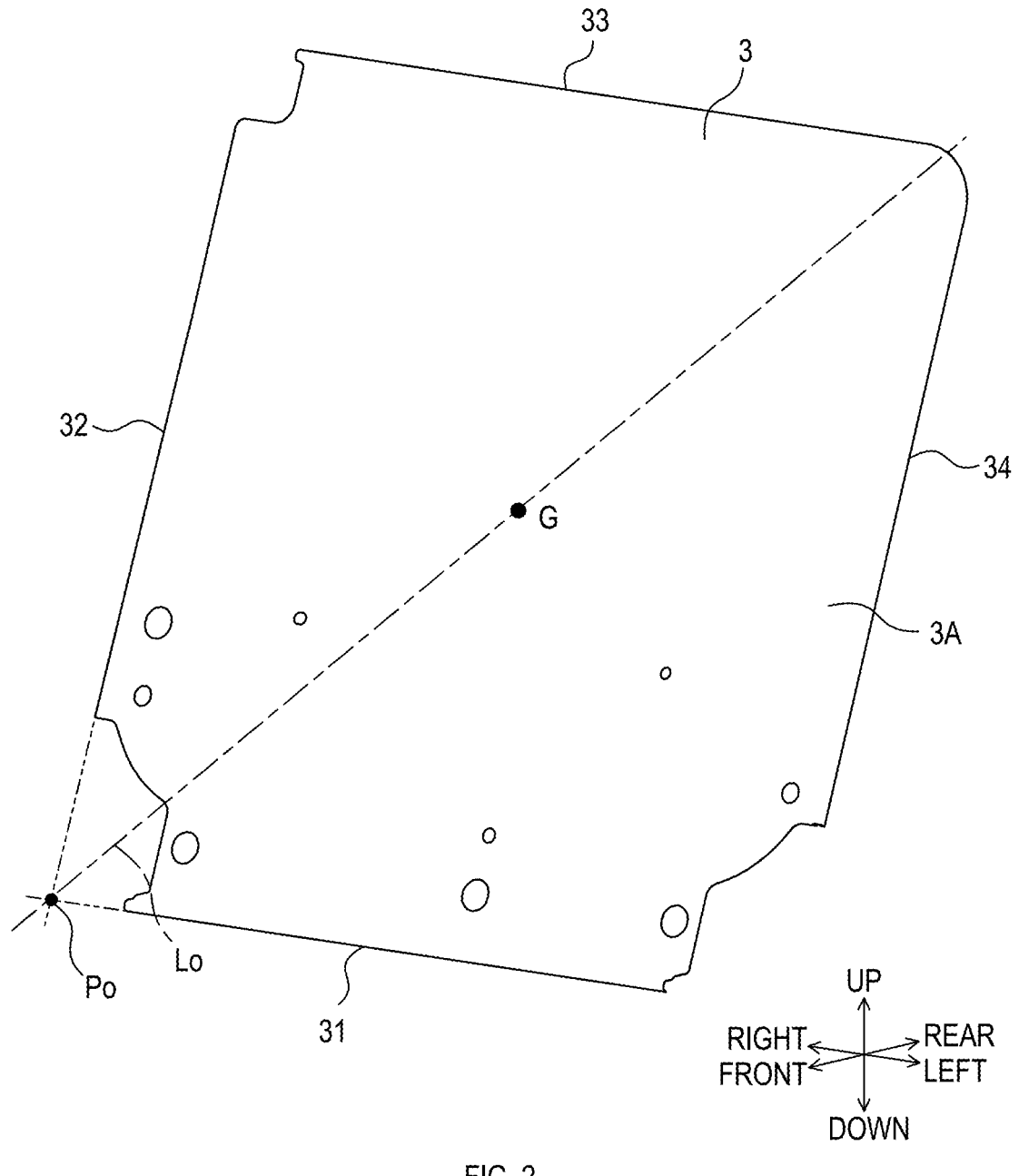
FIG. 2 is a view showing a panel member according to the first embodiment.

As shown in FIG. 2, the panel member 3 is a metal member having a substantially rectangular plate shape. A plate surface 3A of the panel member 3 is provided with a plurality of uneven portions (not shown). These uneven portions are integrally formed in the plate surface 3A by a pressing process (e.g., an embossing process).

Hereinafter, a side part of the panel member 3 on one end side in up-down directions is referred to as a first side part 31, a side part of the panel member 3 on one end side in seat width directions is referred to as a second side part 32, a side part of the panel member 3 on the other end side in the up-down directions is referred to as a third side part 33, and a side part of the panel member 3 on the other end side in the seat width directions is referred to as a fourth side part 34. Therefore, for example, the first side part 31 and the second side part 32 are orthogonal to each other.

As shown in FIG. 1, the first reinforcing member 5 is a metal member that is fixed to the panel member 3 on a side of the first side part 31 and that extends along the first side part 31. The second reinforcing member 7 is a metal member that is fixed to the panel member 3 on a side of the second side part 32 and that extends along the second side part 32.

The third reinforcing member 9 is a metal member that is fixed to the panel member 3 on a side of the third side part 33 and that extends along the third side part 33. The fourth reinforcing member 11 is a metal member that is fixed to the panel member 3 on a side of the fourth side part 34 and that extends along the fourth side part 34.

The first reinforcing member 5 and the third reinforcing member 9 have substantially the same shape. The second reinforcing member 7 and the fourth reinforcing member 11 have substantially the same shape. A coupling structure and the like of "a reinforcing member and a panel member" will be described below by using the first reinforcing member 5 and the second reinforcing member 7 as an example.

<2. Coupling Structure Between First Reinforcing Member and Second Reinforcing Member, and Panel Member>

<2.1 First Reinforcing Member>

Figure 3:
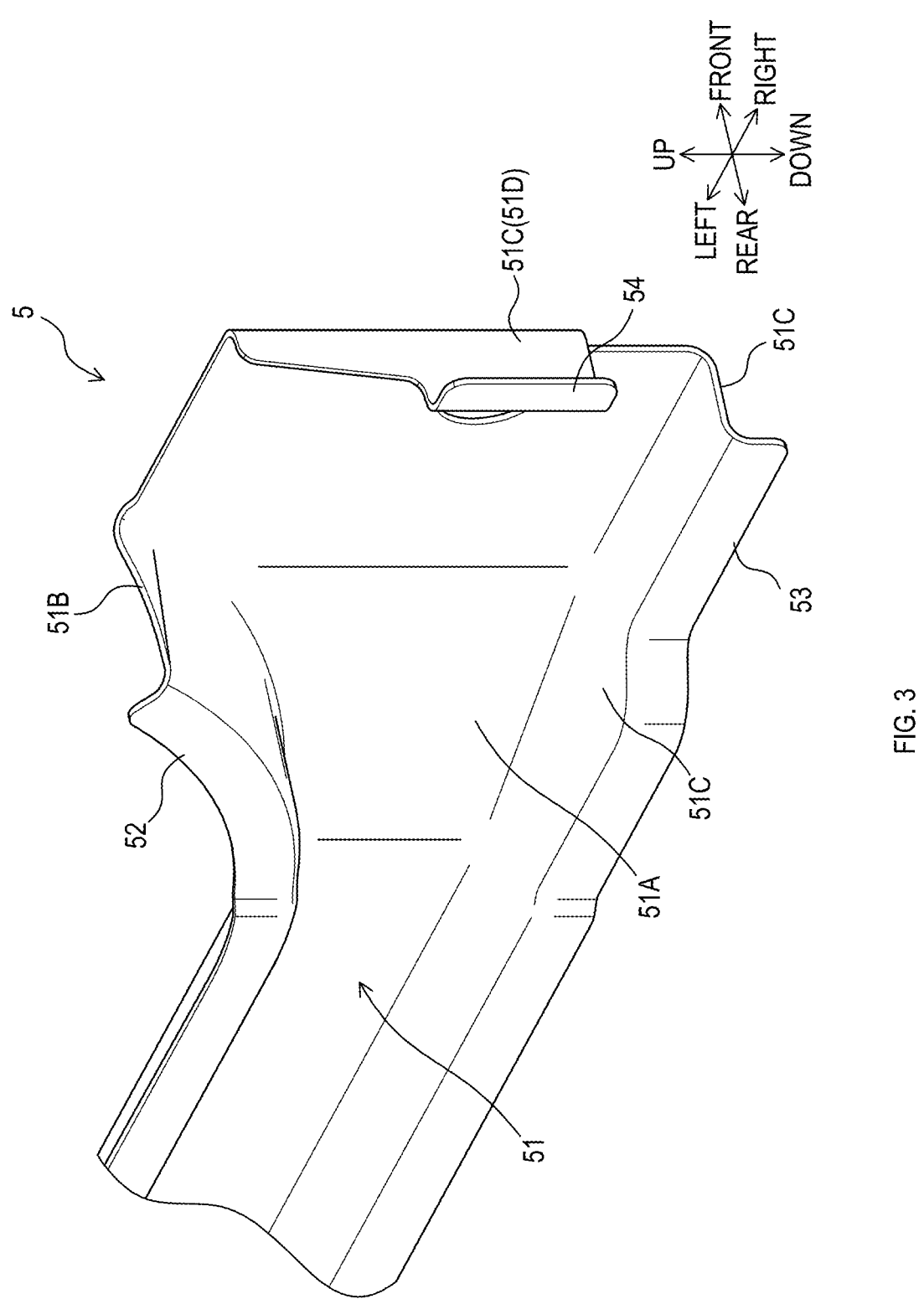
FIG. 3 is a view showing a first reinforcing member according to the first embodiment.
Figure 4:
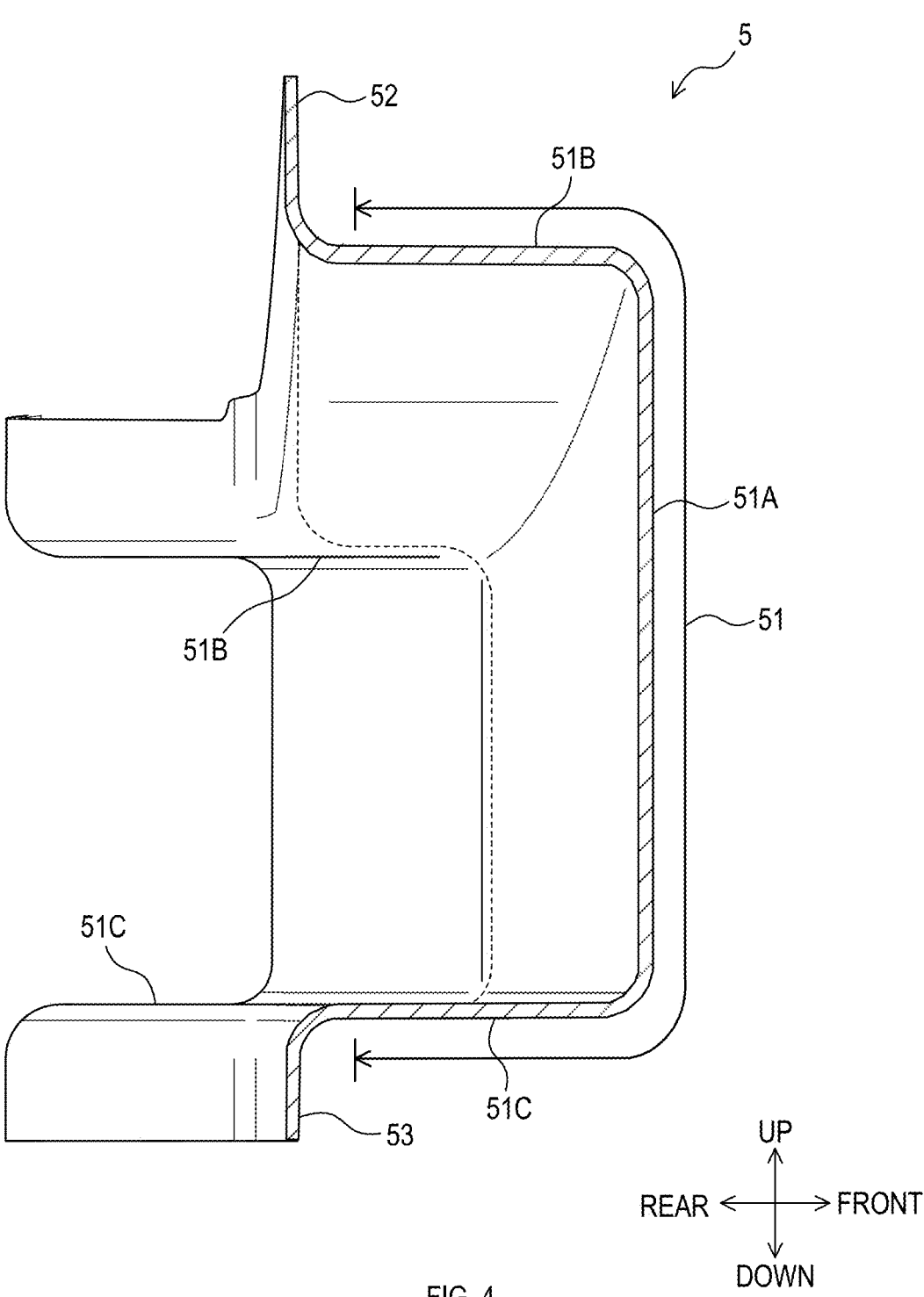
FIG. 4 is a view showing the first reinforcing member according to the first embodiment.

As shown in FIG. 3, the first reinforcing member 5 has a main body 51, a first flange 52, second flanges 53 and 54, and the like. As shown in FIG. 4, the main body 51 is a part curved in a substantially C shape or a substantially U shape with corners.

Figure 5:
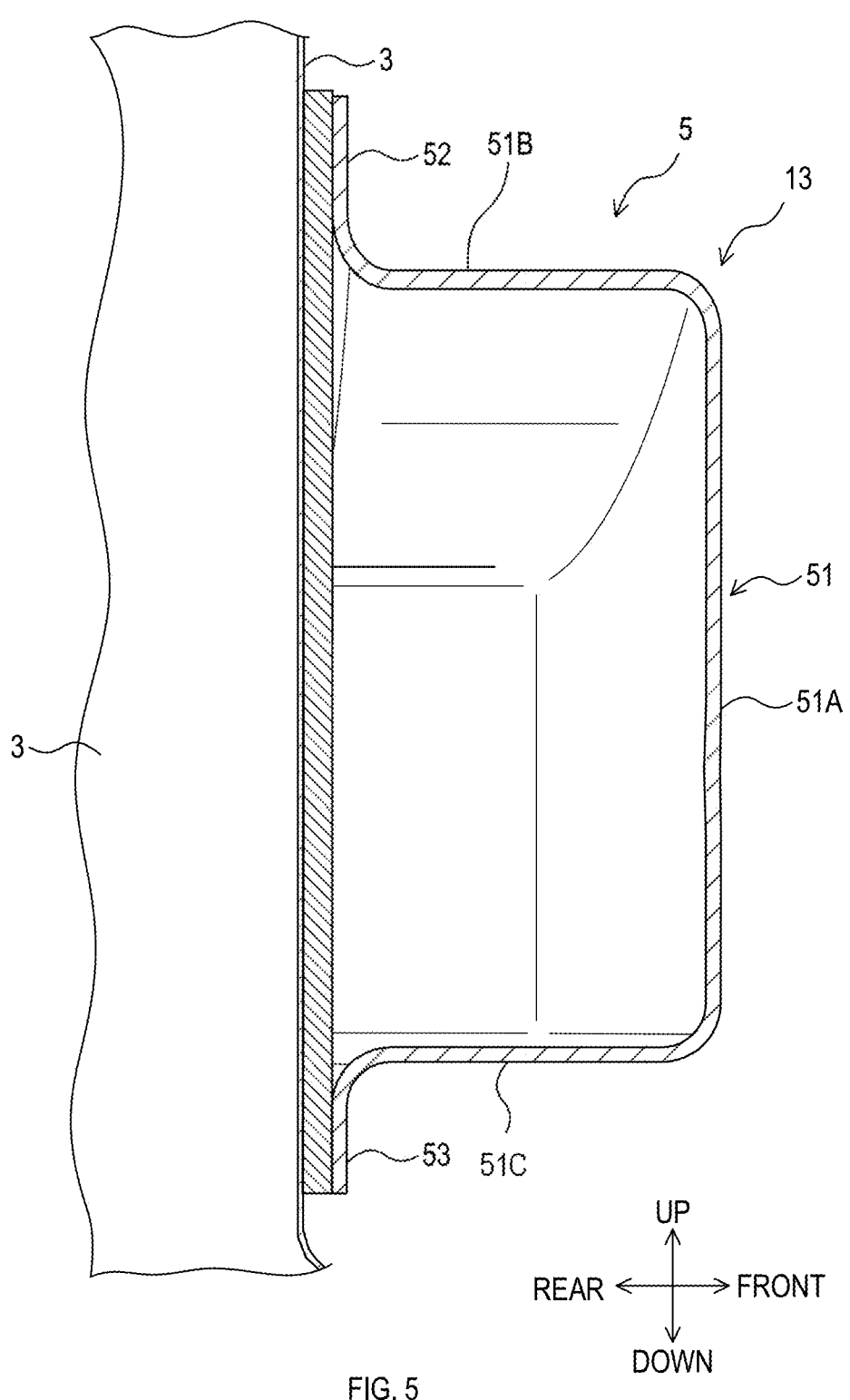
FIG. 5 is a view showing the first reinforcing member and the panel member according to the first embodiment.

Specifically, the main body 51 has a first wall 51A, a second wall 51B, a third wall 51C, and the like. As shown in FIG. 5, the first wall 51A is a wall part facing the panel member 3 across a gap. The first reinforcing member 5 and the second reinforcing member 7 are disposed on a fore side of the panel member 3 in front-rear directions of the seat.

The second wall 51B is a wall part extending from an end portion of the first wall 51A (in FIG. 5, an upper end portion), which is positioned on a side of a face center G of the panel member 3 (refer to FIG. 1), toward the panel member 3. The face center G refers to a position where moments of area are balanced in a case where the panel member 3 is a simple plate having no uneven portions.

The third wall 51C is a wall part extending from an end portion of the first wall 51A (in FIG. 5, a lower end portion), which is opposite to the second wall 51B, toward the panel member 3. As shown in FIG. 1, a part of the second wall 51B on a side of the second reinforcing member 7 is curved so that a center of curvature of the part is on a side of the face center G.

Therefore, in the present embodiment, as shown in FIG. 3, a part 51D is also positioned at an end portion opposite to the second wall 51B. That is, the third wall 51C according to the present embodiment is provided at a lower end of the first reinforcing member 5 and a right end of the first reinforcing member 5, that is, at a longitudinal end portion of the first reinforcing member 5.

The first flange 52 is a part extending in a direction intersecting an extending direction of the second wall 51B from an end of the second wall 51B in the extending direction of the second wall 51B. The second flanges 53 and 54 are parts extending in directions intersecting an extending direction of the third wall 51C from ends of the third wall 51C in the extending direction of the third wall 51C.

Figure 6:
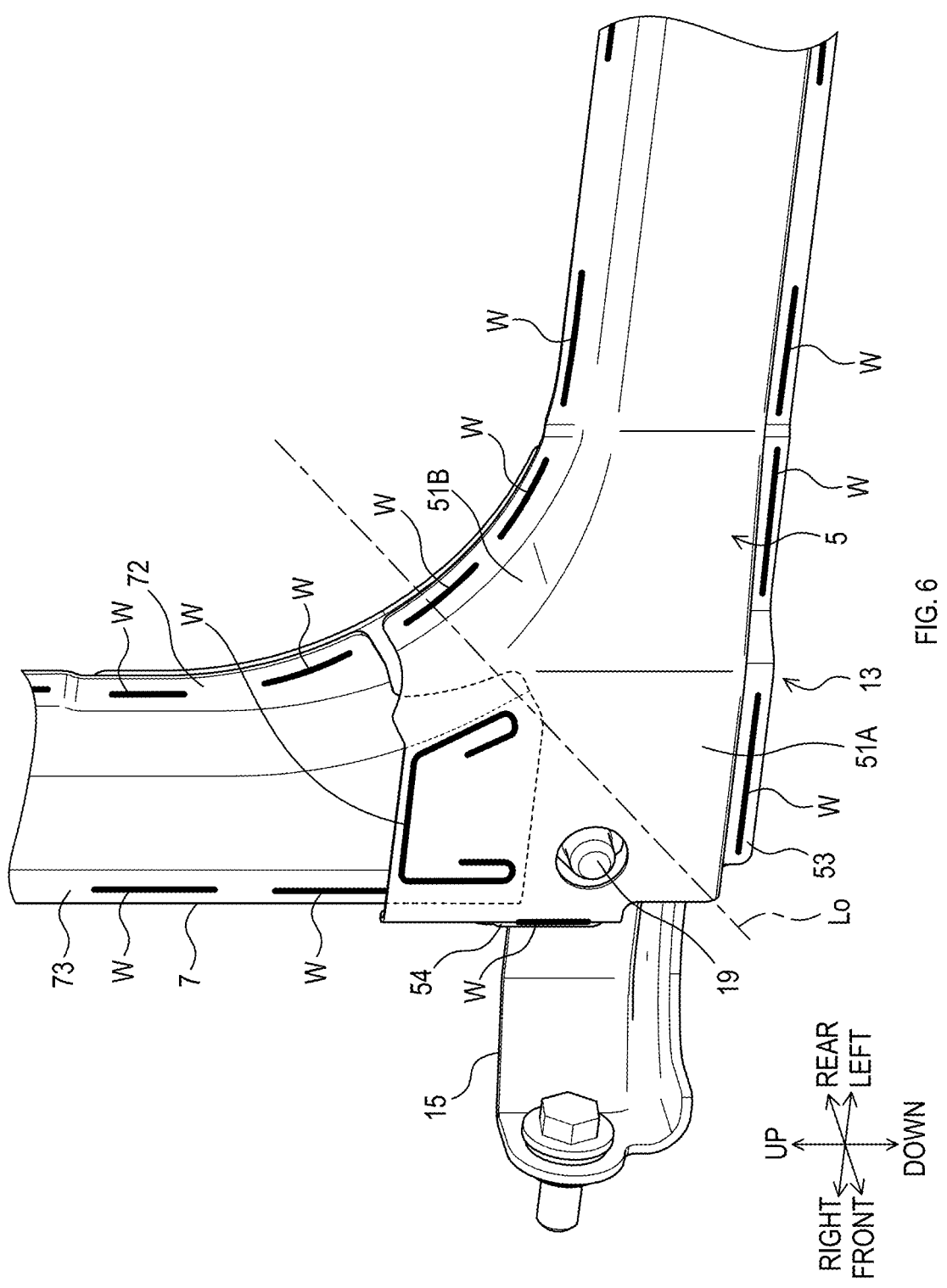
FIG. 6 is a view showing a part of the frame according to the first embodiment.

As shown in FIG. 6, at least a part of each of the first flange 52 and the second flanges 53 and 54 is joined to the panel member 3 by welding (laser welding in the present embodiment). In FIG. 6, a reference sign W denotes a weld bead line or the like.

Specifically, the first flange 52 is welded at either or both of a portion on at least either of sides across a diagonal center line Lo and a portion that crosses the diagonal center line Lo. As shown in FIG. 2, the diagonal center line Lo refers to a diagonal line of the panel member 3 passing through a virtual intersection point Po between the first side part 31 and the second side part 32.

"The first flange 52 is welded at either or both of a portion on at least either of sides across a diagonal center line Lo and a portion that crosses the diagonal center line Lo" refers to, for example, any one of the following four states or a combination thereof. The state in the present embodiment falls under the following states (1) and (4).

(1) A state in which a weld bead line W joining the first flange 52 and the panel member 3 is on one side of the diagonal center line Lo, (2) A state in which the weld bead line W joining the first flange 52 and the panel member 3 is on the other side of the diagonal center line Lo, (3) A state in which the weld bead lines W joining the first flange 52 and the panel member 3 are on the one side and the other side of the diagonal center line Lo, and (4) A state in which the weld bead line W joining the first flange 52 and the panel member 3 crosses the diagonal center line Lo.

The second flange 53 is welded at a portion on the one side of the diagonal center line Lo, and the second flange 54 is welded at a portion on the other side of the diagonal center line Lo. The "one side" is, for example, the "left" side denoted by an arrow in FIG. 6, and the "other side" is the "right" side denoted by an arrow in FIG. 6.

<2.2 Second Reinforcing Member>

Figure 7:
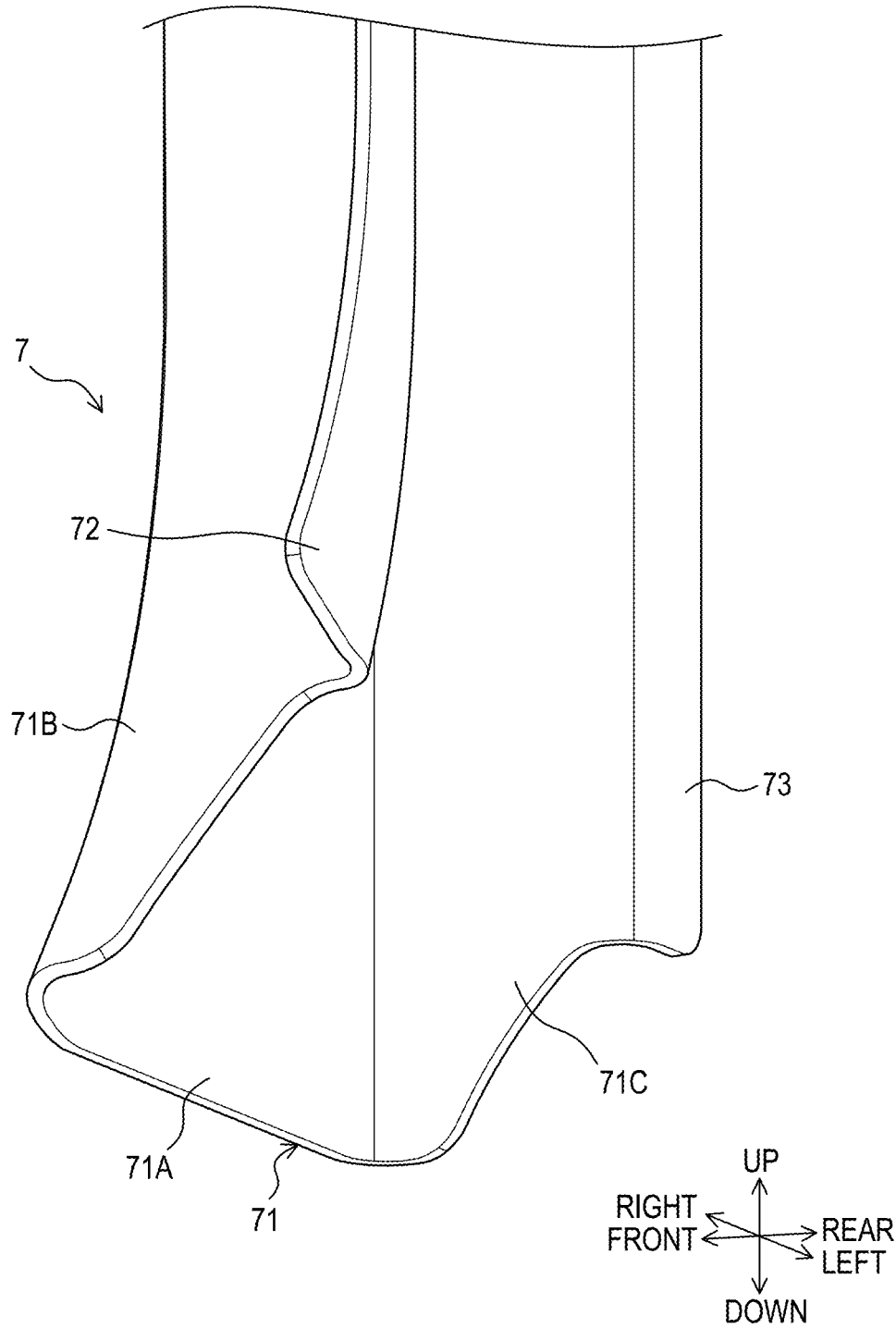
FIG. 7 is a view showing a second reinforcing member according to the first embodiment.

As shown in FIG. 7, the second reinforcing member 7 has a main body 71, a first flange 72, a second flange 73, and the like. The main body 71 is a part curved in a substantially C shape or a substantially U shape with corners.

Specifically, the main body 71 has a first wall 71A, a second wall 71B, a third wall 71C, and the like. The first wall 71A is a wall part facing the panel member 3 across a gap. As shown in FIG. 1, the second wall 71B is a wall part extending toward the panel member 3 from an end portion of the first wall 71A positioned on the side of the face center G.

As shown in FIG. 7, the third wall 71C is a wall part extending toward the panel member 3 from an end portion of the first wall 71A opposite to the second wall 71B. The first flange 72 is a part extending in a direction intersecting an extending direction of the second wall 71B from an end of the second wall 71B in the extending direction of the second wall 71B.

The second flange 73 is a part extending in a direction intersecting an extending direction of the third wall 71C from an end of the third wall 71C in the extending direction of the third wall 71C. As shown in FIG. 6, at least a part of each of the first flange 72 and second flange 73 is joined to the panel member 3 by welding.

<2.3 Coupling Structure Between First Reinforcing Member and Second Reinforcing Member>

As for the first reinforcing member 5 and the second reinforcing member 7, a part of the second reinforcing member 7 on a side of the intersection point Po (a lower end part of the second reinforcing member 7 in FIG. 6) is overlapped and welded with the first wall 51A.

Specifically, the first wall 51A of the first reinforcing member 5 and the first wall 71A of the second reinforcing member 7 are overlapped and welded with each other. In the present embodiment, the first walls 51A and 71A overlap each other such that the part of the second reinforcing member 7 on the side of the intersection point Po is fitted into the main body 51 of the first reinforcing member 5. The overlapped portions are laser welded.

Therefore, a part surrounded by the first to fourth reinforcing members 5, 7, 9, 11 and the panel member 3 has a closed cross-sectional shape as shown in FIG. 5. The part surrounded by the first to fourth reinforcing members 5, 7, 9, 11 and the panel member 3 constitutes a frame 13 (refer to FIG. 1) having a rectangular frame shape, which is substantially formed with a pipe (a square pipe in the present embodiment).

<2.4 Coupling Between Back Frame and Automobile>

As shown in FIG. 1, the back frame 1 is coupled to an automobile body via brackets 15 and 17. Coupling parts between the respective brackets 15 and 17 and the back frame 1 are provided on the frame 13.

Figure 8:
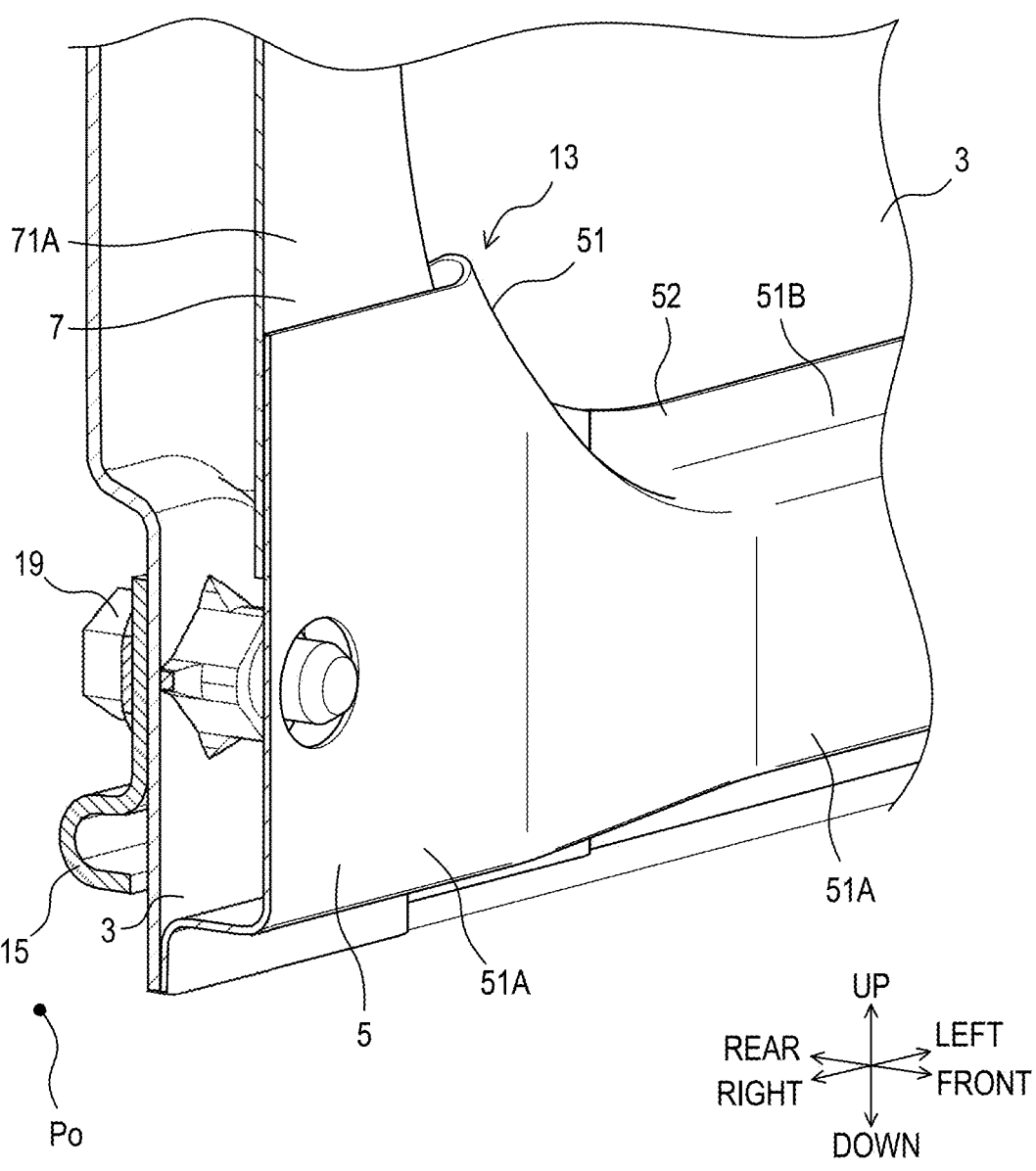
FIG. 8 is a view showing a structure of a frame according to the first embodiment.

In particular, as shown in FIG. 8, a bolt 19 serving as the coupling part between the bracket 15 and the back frame 1 is provided on a part of the panel member 3 constituting the frame 13 on a side of the intersection point Po. In other words, as shown in FIG. 9, the bolt 19 is disposed in a region A in the panel member 3 defined by a virtual line connecting the weld bead lines W on the first flange 52, and the weld bead lines W on the second flanges 53 and 54.

<3. Characteristics of Back Frame According to Present Embodiment>

Figure 9:
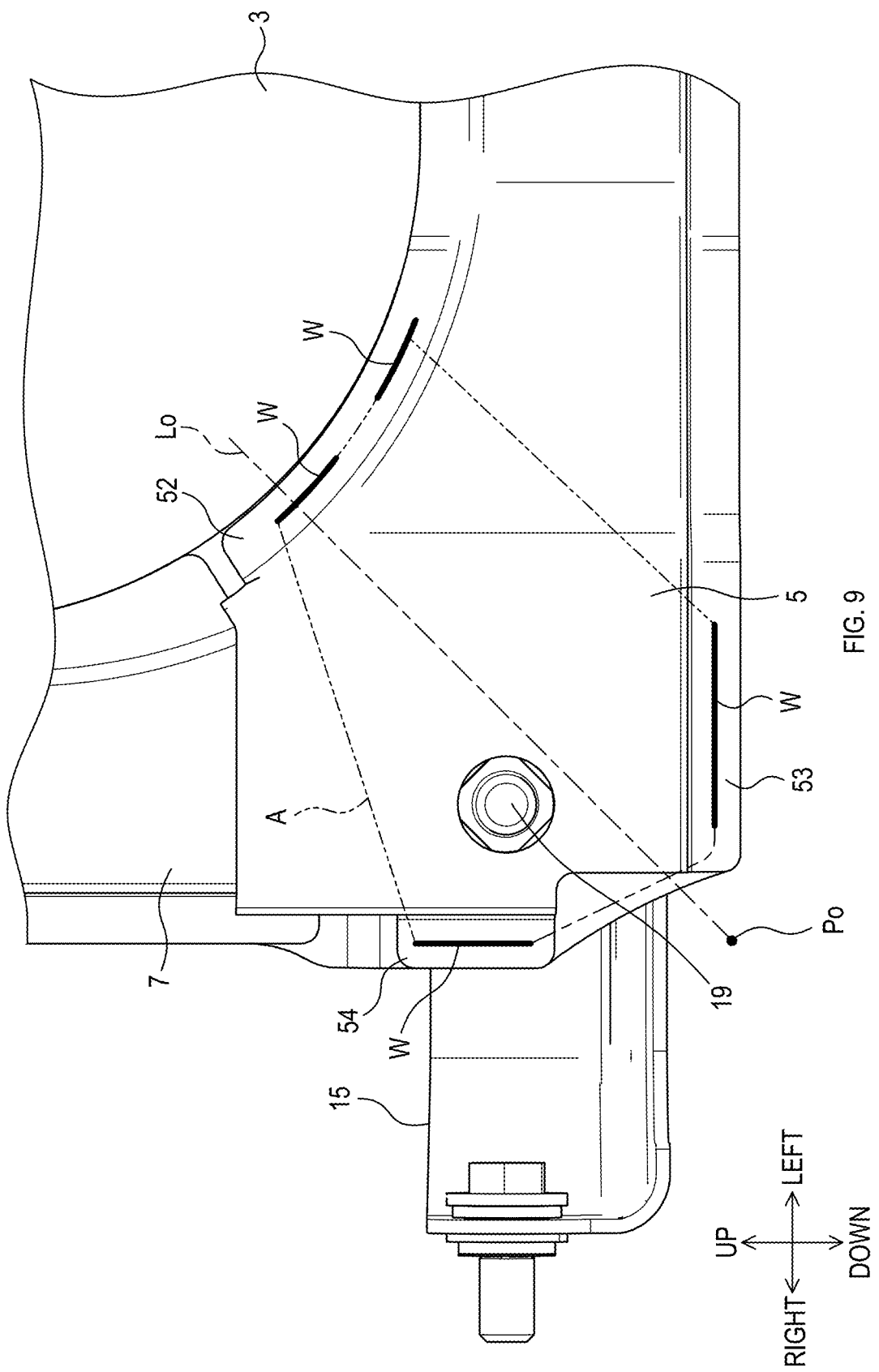
FIG. 9 is a view showing the frame according to the first embodiment.

As shown in FIG. 9, the first flange 52 is welded at either or both of a portion on at least either of sides across the diagonal center line Lo and a portion crossing the diagonal center line Lo, and the second flanges 53 and 54 are welded at respective portions on the one side and the other side across the diagonal center line Lo.

The part of the second reinforcing member 7 on the side of the intersection point Po is overlapped and welded with the first wall 51A of the first reinforcing member 5. As a result, in the back frame 1 according to the present embodiment, strength at the intersection point Po, that is, strength at a corner portion of the panel member 3, can be effectively improved.

The first wall 51A of the first reinforcing member 5 and the first wall 71A of the second reinforcing member 7 are overlapped and welded with each other. As a result, the frame 13 forms a part having a continuous closed cross-sectional shape. Therefore, a load due to an external force can be effectively transmitted to the entire frame 13, and concentration of stress on a part of the back frame can be reduced.

In the present embodiment, a coupling structure between the second reinforcing member 7 and the third reinforcing member 9, a coupling structure between the third reinforcing member 9 and the fourth reinforcing member 11, and a coupling structure between the fourth reinforcing member 11 and the first reinforcing member 5 are also the same as the coupling structure between the first reinforcing member 5 and the second reinforcing member 7. Therefore, in the back frame 1 according to the present embodiment, strength is reliably improved.

Other Embodiments

In the above-described embodiment, laser welding is used for the joining. However, the present disclosure is not limited thereto. That is, in the present disclosure, for example, members may be joined by an adhesive, or joined by welding other than laser welding, such as electric welding.

In the above-described embodiment, the bolt 19 serving as the coupling part between the bracket 15 and the back frame 1 is coupled to the panel member 3. However, the present disclosure is not limited thereto. That is, in the present disclosure, for example, the bolt 19 may be coupled to the first reinforcing member 5 or the second reinforcing member 7.

Similarly to the first reinforcing member 5, the second to fourth reinforcing members 7, 9, 11 according to the embodiment described above also have a main body formed in the C shape or the U shape with corners. However, the present disclosure is not limited thereto. That is, in the present disclosure, for example, the second to fourth reinforcing members 7, 9, 11 may be configured in an L shape.

The frame 13 according to the above-described embodiment has a rectangular, closed cross-sectional shape. However, the present disclosure is not limited thereto. That is, in the present disclosure, for example, the frame 13 may have an oval or a circular closed cross-sectional shape.

In the above-described embodiment, the bolt 19 serving as the coupling part between the bracket 15 and the back frame 1 is coupled to the panel member 3 included in the frame 13. However, the present disclosure is not limited thereto. That is, in the present disclosure, for example, the bolt 19 may be coupled to the first reinforcing member 5 or the second reinforcing member 7.

In the above-described embodiment, the first reinforcing member 5 is disposed on the side of the first side part 31, and the second reinforcing member 7 is disposed on the side of the second side part 32. However, the present disclosure is not limited thereto. That is, in the present disclosure, for example, the second reinforcing member 7 may be disposed on the side of the first side part 31, and the first reinforcing member 5 may be disposed on the side of the second side part 32.

In the above-described embodiment, the vehicle seat according to the present disclosure is applied to an automobile. However, application of the invention disclosed herein is not limited thereto. That is, the present disclosure can also be applied to, for example, seats used for vehicles such as railway vehicles, ships and boats, and aircraft, and to stationary seats used in theaters, homes, and the like.

Furthermore, the present disclosure is not limited to the above-described embodiments as long as it meets the gist of the disclosure described in the above-described embodiments. Therefore, the present disclosure may include a configuration in which at least two of a plurality of embodiments described above are combined, or a configuration in which any of the components shown in the drawings or the components described in the above embodiments with the reference signs is eliminated.

What is claimed is:

1. A vehicle seat back frame that is a back frame applied to a seatback of a vehicle seat, the vehicle seat back frame comprising:
   a panel member including metal and having a substantially rectangular plate shape;
   a first reinforcing member including metal and extending along a first side part of the panel member, the first reinforcing member being fixed to the panel member on a side of the first side part; and
   a second reinforcing member including metal and extending along a second side part of the panel member orthogonal to the first side part, the second reinforcing member being fixed to the panel member on a side of the second side part, wherein
   the first reinforcing member has
      a first wall facing the panel member across a gap, a second wall extending toward the panel member from an end portion of the first wall positioned on a side of a face center of the panel member,
      a third wall extending toward the panel member from an end portion of the first wall opposite to the second wall,
      a first flange extending in a direction intersecting an extending direction of the second wall from an end of the second wall in the extending direction of the second wall, at least a part of the first flange being joined to the panel member, and
      second flanges extending in directions intersecting an extending direction of the third wall from ends of the third wall in the extending direction of the third wall, at least a part of each of the respective second flanges being joined to the panel member, and
   a diagonal line of the panel member passing through a virtual intersection point between the first side part and the second side part is a diagonal center line, the first flange is joined to the panel member at either or both of a portion on at least either of sides across the diagonal center line and a portion crossing the diagonal center line, the second flanges are joined to the panel member at respective portions on one side and the other side across the diagonal center line, and a part of the second reinforcing member on a side of the intersection point is overlapped and joined with the first wall.

2. The vehicle seat back frame according to claim 1, wherein
   the second reinforcing member has
      a first wall facing the panel member across a gap,
      a second wall extending toward the panel member from an end portion of the first wall positioned on the side of the face center,
      a third wall extending toward the panel member from an end portion of the first wall opposite to the second wall,
      a first flange extending in a direction intersecting an extending direction of the second wall from an end of the second wall in the extending direction of the second wall, at least a part of the first flange being joined to the panel member, and
      a second flange extending in a direction intersecting an extending direction of the third wall from an end of the third wall in the extending direction of the third wall, at least a part of the second flange being joined to the panel member, and
   the first wall of the first reinforcing member and the first wall of the second reinforcing member are overlapped and joined with each other.

3. The vehicle seat back frame according to claim 2, wherein,
   a part having a closed cross-sectional shape and including the panel member and at least either the first reinforcing member or the second reinforcing member is a frame, and the frame is provided with a coupling part for coupling with a bracket fixed to a vehicle.

4. The vehicle seat back frame according to claim 3, wherein,
   the coupling part is provided to the panel member included in the frame on the side of the intersection point.

\* \* \* \* \*